United States Patent
Kuki et al.

(10) Patent No.: US 6,856,480 B2
(45) Date of Patent: Feb. 15, 2005

(54) PHASE TOLERANT SERVO GRAY CODE DETECTOR

(75) Inventors: Ryohei Kuki, Tokyo (JP); Isao Takigasaki, Chiba-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 490 days.

(21) Appl. No.: 09/957,224

(22) Filed: Sep. 20, 2001

(65) Prior Publication Data

US 2003/0055572 A1 Mar. 20, 2003

(51) Int. Cl.[7] ............................................. G11B 5/09
(52) U.S. Cl. .................................. 360/49; 360/67
(58) Field of Search ........................... 360/67, 48, 40, 360/51, 49, 46, 77.08; 714/709, 789

(56) References Cited

U.S. PATENT DOCUMENTS

| | | |
|---|---|---|
| 5,345,342 A | 9/1994 | Abbott et al. |
| 5,384,671 A | 1/1995 | Fisher |
| 5,408,503 A | 4/1995 | Kahlman |
| 5,420,730 A | 5/1995 | Moon et al. |
| 5,521,945 A | 5/1996 | Knudson |
| 5,576,906 A * | 11/1996 | Fisher et al. ............. 360/77.08 |
| 5,585,975 A | 12/1996 | Bliss |
| 5,737,142 A * | 4/1998 | Zook ........................... 360/49 |
| 5,920,440 A | 7/1999 | Bang |
| 5,995,561 A | 11/1999 | Yamasaki et al. |
| 6,005,727 A * | 12/1999 | Behrens et al. ................ 360/48 |
| 6,031,474 A | 2/2000 | Kay et al. |
| 6,032,284 A | 2/2000 | Bliss |
| 6,097,320 A | 8/2000 | Kuki et al. |
| 6,115,198 A * | 9/2000 | Reed et al. .................... 360/46 |
| 6,201,652 B1 | 3/2001 | Rezzi et al. |
| 6,233,715 B1 | 5/2001 | Kuki et al. |
| 6,404,582 B1 * | 6/2002 | Rodrigues de Miranda . 360/77.08 |
| 6,460,150 B1 * | 10/2002 | Cideciyan et al. ........... 714/709 |
| 6,507,546 B1 * | 1/2003 | Bliss et al. ................ 369/59.22 |
| 6,622,280 B1 * | 9/2003 | Higashino .................... 714/789 |
| 6,657,800 B1 * | 12/2003 | Ozdemir et al. .............. 360/40 |

* cited by examiner

*Primary Examiner*—Sinh Tran
*Assistant Examiner*—Fred F. Tzeng
(74) *Attorney, Agent, or Firm*—W. Daniel Swayze, Jr.; W. James Brady; Frederick J. Telecky, Jr.

(57) ABSTRACT

Methods and apparatus are disclosed for detecting PR4 equalized Gray codes, providing phase tolerant Gray codes and detection thereof. A Gray code detector is provided, which receives a PR4 equalized Gray code input signal and provides a binary detector output. The detector comprises a plurality of filters providing Euclidean distance values based on the input signal. A logic component selectively provides the detector output based on one or more of the Euclidean distance values from the matched filters, according to one or more criteria, such as the detector mode.

31 Claims, 12 Drawing Sheets

| | SSM | Gray Code | Gray Code | Gray Code | Gray Code | Gray Code |
|---|---|---|---|---|---|---|
| Gray code | N/A | 0 | 1 | 1 | 1 | 0 |
| NRZI 1/6 Gray Code | 0,1,0 | 0,0,1,0,0,0 | 1,0,1,0,1,0 | 1,0,1,0,1,0 | 1,0,1,0,1,0 | 0,0,1,0,0,0 |
| WRITE F.F. OUT | 1,1,0,0 | 0,0,1,1,1,1 | 0,0,1,1,0,0 | 1,1,0,0,1,1 | 1,1,0,0,0,0 | 1,1,0,0,0,0 |
| HEAD OUTPUT | 0,-1,0 | 0,0,1,0,0,0 | -1,0,1,0,-1,0 | 1,0,-1,0,1,0 | 0,0,-1,0,0,0 | 0,0,-1,0,0,0 |
| PR4 EQUALIZATION | -1,-1 | 0,0,1,1,0,0 | -1,-1,1,1,-1,-1 | 1,1,-1,-1,1,1 | 1,1,-1,-1,1,1 | 0,0,-1,0,-1,0,0 |
| $(Y_{-5} + Y_{-4} - 2Y_{-3} - 2Y_{-2} + Y_{-1} + Y_0)$ | N/A | -4 | -8 | 8 | 4 | 4 |
| POLARITY | N/A | 1 | -1 | 1 | 1 | -1 |
| C0 | N/A | -4 | 8 | 8 | 8 | -4 |
| Gray code detector output | N/A | 0 | 1 | 1 | 1 | 0 |

| code | ptrn. | Phase Shift | Equalizer Output | | | | | | | MF Output | | | det0 | det1 | det2 | det |
|---|---|---|---|---|---|---|---|---|---|---|---|---|---|---|---|---|
| | | | $Y_{-5}$ | $Y_{-4}$ | $Y_{-3}$ | $Y_{-2}$ | $Y_{-1}$ | $Y_0$ | | C0 | C1 | C2 | (Vt0 = 3.5) | (Vt1 = 1.5) | (Vt1 = 1.5) | |
| "0" | A0 | no | 0 | 0 | 1 | 1 | 0 | 0 | | -4 | -1 | -1 | 0 | 0 | 0 | 0 |
| | A1 | 1T right | 0 | 0 | 0 | 1 | 1 | 0 | | -1 | 0 | -2 | 0 | 0 | 0 | 0 |
| | A2 | 1T right | -1 | 0 | 0 | 1 | 1 | 0 | | -2 | -1 | -2 | 0 | 0 | 0 | 0 |
| | A3 | 1T left | 0 | 1 | 1 | 0 | 0 | 0 | | -1 | -2 | 0 | 0 | 0 | 0 | 0 |
| | A4 | 1T left | 0 | 1 | 1 | 0 | 0 | -1 | | -2 | -2 | -1 | 0 | 0 | 0 | 0 |
| "1" | B0 | no | 1 | 1 | 1 | -1 | 1 | 1 | | 8 | 1 | 1 | 1 | x | x | 1 |
| | B1 | 1T right | 0 | 1 | 1 | -1 | -1 | 1 | | 1 | -2 | 3 | x | 0 | 1 | 1 |
| | B2 | 1T right | -1 | 1 | 1 | -1 | -1 | 1 | | 0 | -3 | 3 | x | 0 | 1 | 1 |
| | B3 | 1T left | 1 | -1 | -1 | 1 | 1 | 0 | | 1 | 3 | -2 | x | 1 | 0 | 1 |
| | B4 | 1T left | 1 | -1 | -1 | 1 | 1 | -1 | | 0 | 3 | -3 | x | 1 | 0 | 1 |

278

C0 = $(Y_{-5} + Y_{-4} - 2 \cdot Y_{-3} - 2 \cdot Y_{-2} + Y_{-1} + Y_0)$ * POLARITY
C1 = $(Y_{-5} - Y_{-4} - Y_{-3})$ * POLARITY
C2 = $(-Y_{-2} - Y_{-1} + Y_0)$ * POLARITY

| code | NRZI | PR4 Equalized |
|---|---|---|
| "0" | (0, 0, 1, 0, 0, 0) | (0, 0, 1, 1, 0, 0) or (0, 0, -1, -1, 0, 0) |
| "1" | (1, 0, 1, 0, 1, 0) | (1, 1, -1, -1, 1, 1) or (-1, -1, 1, 1, -1, -1) |

| code | NRZI |
|---|---|
| "0" | (0, 0, 1, 0, 1, 0) |
| "1" | (1, 0, 1, 0, 0, 0) |

| MODE | Vt0 | Vt1 |
|---|---|---|
| SEEK | 2.00 | 1.50 |
| TRACK | 3.50 | 1.50, 1.75, 2.00, 2.25 programmable |

FIG. 8

| "1" - "0" | $Y_{-5}$ | $Y_{-4}$ | $Y_{-3}$ | $Y_{-2}$ | $Y_{-1}$ | $Y_0$ | $d^2$ |
|---|---|---|---|---|---|---|---|
| B0-A0 | 1 | 1 | -2 | -2 | 1 | 1 | 12 |
| B0-A0 | 1 | 1 | -1 | -2 | 0 | 1 | 8 |
| B0-A0 | 2 | 1 | -1 | -2 | 0 | 1 | 11 |
| B0-A0 | 1 | 0 | -2 | -1 | 1 | 1 | 8 |
| B0-A0 | 1 | 0 | -2 | -1 | 1 | 2 | 11 |
| B0-A0 | 0 | 1 | 0 | -2 | -1 | 1 | 7 |
| B0-A0 | 0 | 1 | 1 | -2 | -2 | 1 | 11 |
| B0-A0 | 1 | 1 | 1 | -2 | -2 | 1 | 12 |
| B0-A0 | 0 | 0 | 0 | -1 | -1 | 1 | 3 |
| B0-A0 | 0 | 0 | 0 | -1 | -1 | 2 | 6 |
| B0-A0 | -1 | 1 | 0 | -2 | -1 | 1 | 8 |
| B0-A0 | -1 | 1 | 1 | -2 | -2 | 1 | 12 |
| B0-A0 | 0 | 1 | 1 | -2 | -2 | 1 | 11 |
| B0-A0 | -1 | 0 | 0 | -1 | -1 | 1 | 4 |
| B0-A0 | -1 | 0 | 0 | -1 | -1 | 2 | 7 |
| B0-A0 | 1 | -1 | -2 | 0 | 1 | 0 | 7 |
| B0-A0 | 1 | -1 | -1 | 0 | 0 | 0 | 3 |
| B0-A0 | 2 | -1 | -1 | 0 | 0 | 0 | 6 |
| B0-A0 | 1 | -2 | -2 | 1 | 1 | 0 | 11 |
| B0-A0 | 1 | -2 | -2 | 1 | 1 | 1 | 12 |
| B0-A0 | 1 | -1 | -2 | 0 | 1 | -1 | 8 |
| B0-A0 | 1 | -1 | -1 | 0 | 0 | -1 | 4 |
| B0-A0 | 2 | -1 | -1 | 0 | 0 | -1 | 7 |
| B0-A0 | 1 | -2 | -2 | 1 | 1 | -1 | 12 |
| B0-A0 | 1 | -2 | -2 | 1 | 1 | 0 | 11 |

FIG. 10

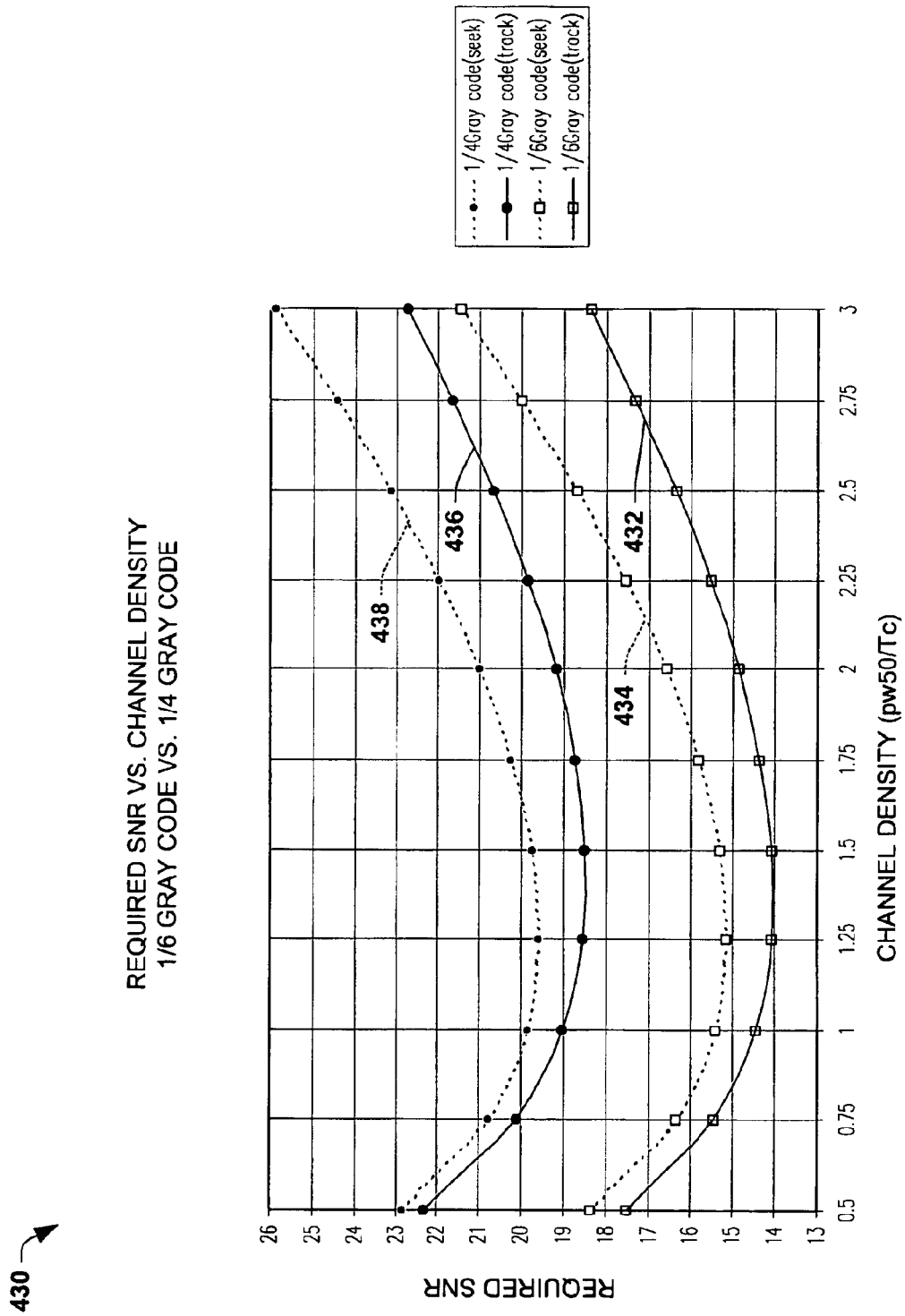

PHASE TOLERANT SERVO GRAY CODE DETECTOR

FIELD OF INVENTION

The present invention relates generally to mass storage devices and more particularly to servo Gray code detectors and methodologies for detecting servo information on a mass storage device data disk.

BACKGROUND OF THE INVENTION

Mass storage devices are employed in a variety of applications where large amounts of information need to be stored in a retrievable manner. Such applications include computers and computer-type applications, wherein one or more mass data storage devices, often referred to as hard disk drives, CD-ROMs, or the like, have one or more rotating disks in which data can be stored. For example, disks in a typical hard disk drive comprise a magnetic, optical, or other media that can store such data, and from which such information can be read or retrieved. Data or other information is written to or recorded in certain field portions of rings or tracks that are physically located progressively radially outwardly from the center of the disk. Such disks are often divided into radial tracks, wherein multiple sectors are formed within individual tracks on the disk.

A read/write head is provided which is scanned above the disk surface in a controlled fashion while the disk is rotated, so as to electrically interface with particular tracks and sectors of the disk in read or write operations. The read/write head is part of a read channel in the mass storage device, which interfaces the computer with the storage disk. The disk may be used to store many types of information or data, including user data as well as control information, used to position the read/write head at the desired location relative to the rotating disk. Such data may be stored in segmented locations or regions on the disk, such as user sectors and control or servo sectors for storing position information used in positioning the read/write head. For example, the data on a disk may include servo data, such as Gray code information, automatic gain control (AGC) signals, head alignment bursts, and the like, recorded in servo sectors, as well as user data, recorded in user data sectors.

Each track on the disk generally includes one or more servo sectors located at spaced locations along the track. Each servo sector has a number of fields, each for providing information for location or control of the head data transducer. For instance, an AGC burst field is provided, which enables AGC circuitry to automatically adjust the gain in the head amplifiers to allow the subsequent data to be properly detected. Also included in the servo sector is a field having one or more sync marks so that the longitudinal position of the head relative to the track of interest can be determined, which may follow the AGC field. The sync marks may be used, for example, to enable subsequent fields, such as the user data sectors or Gray code data to be located by counting a predetermined elapsed time from the time that the sync marks are detected.

A Gray code field is also provided in the sector, having Gray code data therein from which the identification of the particular radial track over which the head is positioned can be established. Following the Gray code field is a binary data field, for example, having longitudinal track identification information, so that the identity of each track region between adjacent servo sectors can be established. After the binary data field, a number of servo burst fields are provided for precision alignment of the head laterally with respect to the selected track.

In a read operation, one or more read/write heads are selectively radially moved over the track which includes the data of interest. Gray codes prerecorded onto each data track or ring are decoded to determine the instantaneous position of the data transducer heads with respect to the rotating disk. The read/write transducer heads are typically positioned by means of a closed-loop servo system in accordance with the decoded Gray code that has been detected. More particularly, the data transducer heads read the Gray code servo information recorded within data tracks on disks. The servo information typically includes track addresses, and optionally sector addresses and servo bursts. The track addresses are used as coarse positioning information and servo bursts are used as fine positioning information.

As the transducer heads are being moved to a desired track location, the transducer head reads the track addresses provided by the Gray codes in order to determine its instantaneous location. Often, the transducer head is positioned between two adjacent tracks, and may receive a superposition of signals from both tracks. However, due to the data characteristics of Gray codes, the position ambiguity can be resolved. Thus, when the head is on an interface between two tracks, either of the two track addresses will be correctly detected, due to the characteristics of the Gray code used. The Gray codes may then be used to reposition the head radially so as to no longer be on the interface between two tracks.

The data sectors on the selected track may be synchronously recovered after timing acquisition by a phase lock loop circuit, but the detection of the servo sectors on a track are often performed asynchronously. It is difficult to realize high-speed detection and high-density recording by asynchronous servo detection methods. Various synchronous servo techniques have accordingly been employed, such as partial response maximum likelihood (PRML) signal processing. In this approach, timing is synchronized in the servo preamble region by a phase lock loop circuit, and the track address and servo bursts are synchronously sampled and decoded.

Partial response processing is thus employed in order to address intersymbol interference (ISI). However, as data densities increase in mass storage devices, adjacent channel responses to transitions in media tend to interact with each other such that the ideal single transition shape is degraded randomly, leading to difficulties in considering the transition shape as an appropriate transition symbol at detector stages. Where the partial channel response takes the form of linear superposition of known individual symbol shapes, interference between adjacent transitions can be anticipated and taken into consideration in detector strategies. Typical read channels for such mass storage devices thus provide equalization of the response channel to a standard shape and a Viterbi maximum likelihood detector. Equalization addresses ISI control by placing the sampling moments in a position on the response shape, so as to control interference. The Viterbi detector analyzes the received signal shape, based on an appropriate succession of samples from which a decision can be inferred.

Partial response channels coupled with appropriate detectors thus facilitate increased density in data storage devices, particularly as data densities continue to increase. A polynomial operator P characterizes the partial response channel which applies to a non-return-to-zero (NRZ) random initial binary sequence via polarization and converts the binary sequence into a ternary sequence, which is then forwarded to the detector input. Typical channels have a (1−D) polynomial characteristic to model differential action of the media-head interaction, with a single sample in the center of the received symbol. The partial response 4 (PR4), is a first partial response applied in mass storage devices, having a (1−D)(1+D) polynomial characteristic, wherein the (1+D) factor designs the two symmetric samples on the equalized symbol response (1,1 sequence). Increasing 1+D factors to 2 in the P expression results in an EPR4 (Extended Partial Response 4) channel, with three samples per symbol (two symmetric ½ amplitude samples and one central full amplitude sample (−1,2,1 sequence), and in E2PR4 for (1−D)(1+D)$^3$, which has two unequal peers of symmetric samples in 1,3,3,1 sequence. The number and size of samples per symbol fix the accepted interference, to be taken into consideration at the decoding stage.

Mass storage device manufacturers continue to strive for greater capacity (e.g., higher data density) in hard disk drives and other mass storage devices. However, as a result, interference between adjacent data symbols (ISI) has increased, lowering the signal-to-noise ratio in the detected signals from the data storage medium. Thus, as data density is increased, it is more difficult to properly detect the signals read from the data medium, and consequently, more difficult to rapidly and properly position the data read/write head transducers. Therefore, there remains a need for improved mass storage device read channels and Gray code detectors therefor, by which servo data can be properly read from high density data storage disks for servo positioning of read/write heads.

SUMMARY OF THE INVENTION

The following presents a simplified summary in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later. The invention relates to mass storage device read channels and Gray code detectors therefor, by which the above mentioned and other shortcomings of current Gray codes and Gray code detectors in such devices can be mitigated or overcome.

Methods and apparatus are provided for detecting PR4 equalized Gray codes in an input signal, such as servo data read from a mass storage device disk, in order to provide servo control for a read/write head. The invention provides phase tolerant Gray codes and detection therefor, which can mitigate detection errors in the presence of data phase shifts, and which can be employed in both seek mode where the read/write head is moved quickly from one radial track position to another, as well as in track mode for fine positioning of the read/write head to locate the center of the target track.

According to one aspect of the invention, a Gray code detector is provided, which receives a PR4 equalized Gray code input signal and provides a binary detector output. The detector output is generated using a plurality of matched filters, wherein individual bits of the input signal are multiplied by filter coefficients and summed, in order to provide Euclidean distance values associated with each of the filters based on the input signal. The filter outputs may be multiplied by a polarity signal and compared with corresponding threshold values to provide Boolean signals to a logic component. The logic component then provides the Gray code detector output based on one or more of the Euclidean distance values from the matched filters.

The filter outputs may be selectively employed by the logic component to provide correct detector output data in the presence of phase shifting in the input signal, whereby ISI problems can be avoided or mitigated. For instance, the logic component may advantageously provide the detector output according to whether the mass storage device is in seek mode or in track mode. In this regard, the threshold values compared with the filter outputs may be changed by the logic component depending on the detector mode, as well as the selection of which filter output to use as the detector output. Thus, one filter output may be used for the detector output in a first mode, with combinations of filter outputs providing the detector output in a second mode. In this manner, the invention provides for selective employment of matched filter outputs in order to improve noise immunity in the read channel, depending upon how the device is being used (e.g., seek mode or track mode).

Other aspects of the invention provide Gray codes and methods for Gray code detection, which may be employed in mass storage device read channels. Also provided are mass storage device read channels in which a plurality of filter outputs are selectively employed to provide a Gray code detector output for use in positioning a read/write head. The various aspects of the invention may be implemented in hardware, software, or combinations thereof, by which improved Gray code detection can be achieved.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 5 is a table illustrating the alternating polarity of one exemplary Gray code and detector in accordance with the invention;

FIG. 6 is a table illustrating the phase tolerance of the exemplary Gray code detector of FIG. 4;

FIG. 7a is a table illustrating an exemplary Gray code in accordance with the present invention;

FIG. 7b is a table illustrating another exemplary Gray code in accordance with the present invention;

FIG. 8 is a table illustrating selective employment of threshold values in the exemplary Gray code detector of FIG. 4 according to the present invention;

FIG. 10 is a table illustrating Euclidean distances between phase shifted "0" and "1" values in accordance with the invention;

FIG. 14 is a graph of required signal to noise ratio (SNR) versus channel density for an exemplary rate 1/6 Gray code in accordance with the present invention.

DETAILED DESCRIPTION OF THE INVENTION

Figure 1:
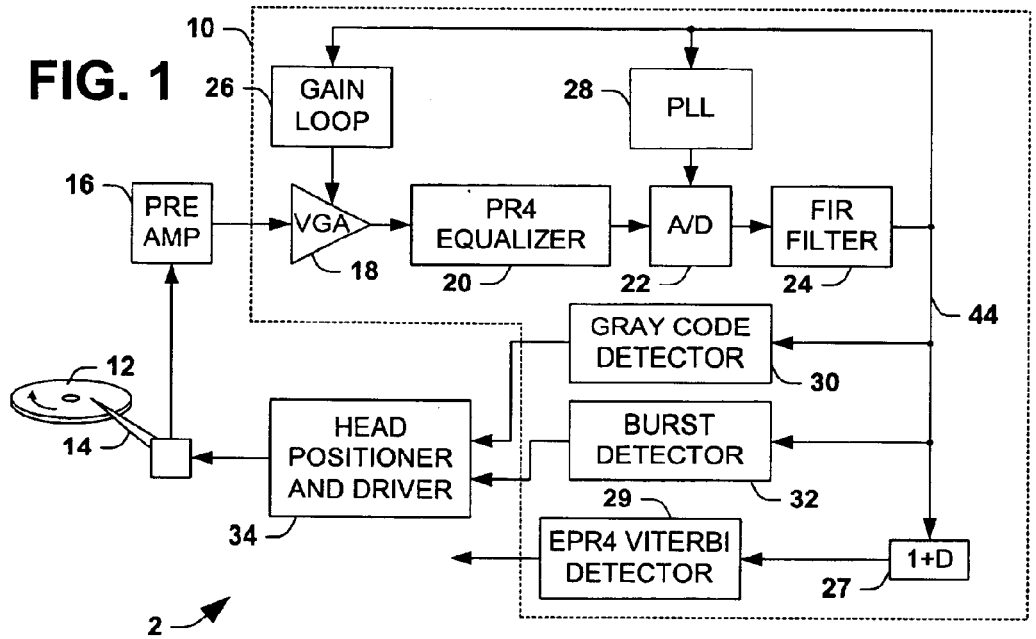
FIG. 1 is a schematic diagram illustrating an exemplary mass storage system including various components within a read channel, which can be employed to detect Gray codes used in a servo circuit for positioning the data transducer heads in accordance with an aspect of the present invention.

The present invention will now be described with reference to the attached drawings, wherein like reference numerals are used to refer to like elements throughout. The invention relates to Gray codes and Gray code detection, finding particular utility in association with mass storage device read channels. The following is a description of one or more implementations of various aspects of the invention, wherein Gray code detection is performed in hardware. However, it will be appreciated by those skilled in the art that one or more aspects of the present invention may be implemented in software, hardware, or combinations thereof, and that all such implementations are contemplated as falling within the scope of the present invention and the appended claims.

Referring initially to FIG. 1, an exemplary read channel 10 of a mass storage device 2 is illustrated in which various aspects of the present invention may be implemented. The read channel 10 interfaces with a rotating disk 12, and a read/write transducer head 14, which is selectively radially positionable to read data from the concentric paths formed on the disk 12. The signals read by the head 14 are amplified in a pre-amplifier circuit 16 to provide an output signal to a variable gain amplifier (VGA) 18 in the read channel 10. The gain of the VGA 18 is controlled via a feedback loop, as described below. In this manner, signals from the head 14 are amplified by the preamplifier 16 and the magnitude of the signals is adjusted by the VGA 18. The output from the VGA 18 is connected to a PR4 continuous time equalizer 20. The output from the PR4 equalizer 20 is digitized in an analog to digital (A/D) converter 22, the output of which is connected a finite impulse response (FIR) filter 24. The signals are equalized to a PR4 target by the continuous time PR4 equalizer and the FIR filter 24 using known techniques. The output from the FIR filter 24 is connected to a gain loop circuit 26 to control the amplitude of the signal provided by the VGA 18, and also to a phase lock loop (PLL) circuit 28, which recovers a timing signal to control the analog to digital converter 22.

The output of the FIR filter 24 is provided to a second filter 27, which provides an output for detection in an EPR4 Viterbi detector 29. The response of the second filter 27, in combination with the response of the FIR filter 24, conditions the signal to be suitable for an EPR4 target. For example, if the response of the FIR filter 24 is $(1+D)^2$, the response of the second filter 27 may be $(1+D)$. As the PR4 signals from the data sections pass through the $(1+D)$ filter 27, they become EPR4 signals. The EPR4 Viterbi detector 29 recovers the data from the data sectors, in a known manner. The output from the FIR filter 24 is also provided to a Gray code detector 30, constructed in accordance with the present invention as described in detail below, as well as to a burst detector circuit 32. The outputs from the Gray code detector 30 and the burst detector circuit 32 are connected to a head positioner and driver circuit 34, which controls the movement of the transducer head 14 to a selected position determined by the Gray code detected by the Gray code detector 30.

Figure 2:
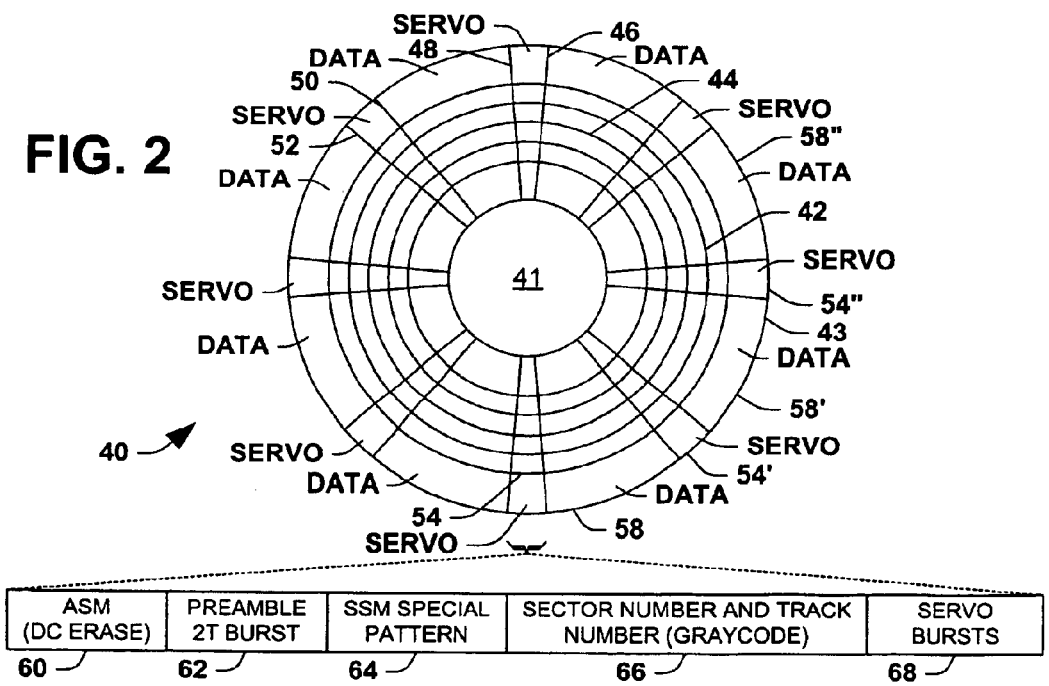
FIG. 2 is a top plan view illustrating a data disk used in a mass storage device, having a radial ring layout of the data tracks thereof, together with a diagram showing a typical layout of a sequence of data longitudinally along a portion of a track which may be used in the construction of the disk.

FIG. 2 illustrates a portion of an exemplary mass data storage device environment in which various aspects of the present invention may be practiced. A data disk or platter 40 is provided, which is coated with a magnetic material of the type used in a typical hard disk drive assembly. Data and other information (not shown) are written onto a number of concentrically located tracks or rings 42 and 44, wherein other tracks are illustrated in the figure, but are not numerically designated for purposes of clarity. The tracks 42 and 44 comprise user data sectors and servo sectors, which are arranged in concentric rings from the inside diameter of the disk 40 at a hub 41 to the outside diameter of the disk 40 at an edge 43.

Radial lines 46, 48, 50, and 52 extend from the hub 41 to the edge 43, wherein the lines 46, 48, 50, and 52 do not actually exist in a physical device, but are provided in FIG. 2 for purposes of illustrating the alignment of the fields of the tracks 42, 44. The lines 46, 48, 50, and 52 correspond to the location of the servo sectors at each respective intersection of the lines with the rings 42 and 44. Although the lines 46, 48, 50, and 52 are illustrated as being continuous, it will be appreciated that in many cases they may have jogs (not shown) at certain locations due to the difference in the number of sectors that can exist in the longer outward rings compared to the number of sectors that can exist in the shorter inward rings.

A servo sector exists at the junction of each of the radial lines 46, 48, 50, and 52, and its respective track. Servo sectors are written by the disk drive manufacturer by a device known as a track writer (not shown) using a process known as hard formatting, and are never re-written. A portion of one of the rings or tracks within one of the sectors 46, 48, 50, or 52, for example, the servo sector portion 54, is illustrated in the lower portion of FIG. 2. The servo sector portion 54 may be identical to other servo sector portions that repeat continuously around the ring 42, such as servo sectors 54' and 54", which separate respective user data sector regions 58, 58', and 58", which are of a known format.

The servo sectors 54, 54', and 54" comprise a number of fields, wherein the precise content of the fields in each servo sector 54, 54', and 54" may vary from manufacturer to manufacturer. It will be appreciated that the ordering of such servo sector fields illustrated and described hereinafter is but one implementation, and that other orderings are possible. In the illustrated implementation, a typical servo sector 54 comprises an initial asynchronous servo mark (ASM) field 60, used for the servo sector search. For example, a long DC erase pattern, such as a pattern that would not be encountered in the data sectors 58, may be used as the ASM field 60, in order to find the start of the servo sector 54. The long DC erase pattern in the ASM field 60 is typically used for acquiring synchronous timing by the phase lock loop circuit 28.

The ASM field 60 may be followed by a preamble field 62 comprising, for example, a 2T burst, which may be followed by a synchronous servo mark (SSM) field 64, comprising a special pattern, if desired. The SSM pattern in the field 64 is used to detect the start point of the Gray codes and enables the servo bursts to be synchronously detected. Following the SSM field 64 is a Gray code field 66 comprising, for example, an encoded sector number and an encoded track number. Following the Gray code field 66 is a series of servo bursts in a burst field 68. The bursts in the field 68 are used to ensure the alignment of the head squarely along the track or path of the ring being followed. After the burst field 68, the data sectors 58 follow, as shown in the upper part of FIG. 2.

The Gray code field 66 comprises Gray code data, which may be encoded in accordance with the invention, using a rate 1/6 Gray code equalized to a PR4 target, as illustrated and described hereinafter with respect to FIG. 7a. This encoding technique allows the Gray code signals to be recovered by the exemplary Gray code detector 30, wherein the detectors 102 and 202 illustrated and described hereinafter with respect to FIGS. 3 and 4 may be employed as the Gray code detector 30 in the read channel 10 of FIG. 1. In accordance with the invention, the use of the rate 1/6 Gray code and a plurality of matched filters in the Gray code detector 30 provides improved performance when compared with conventional Gray coding and detection.

Figure 3:
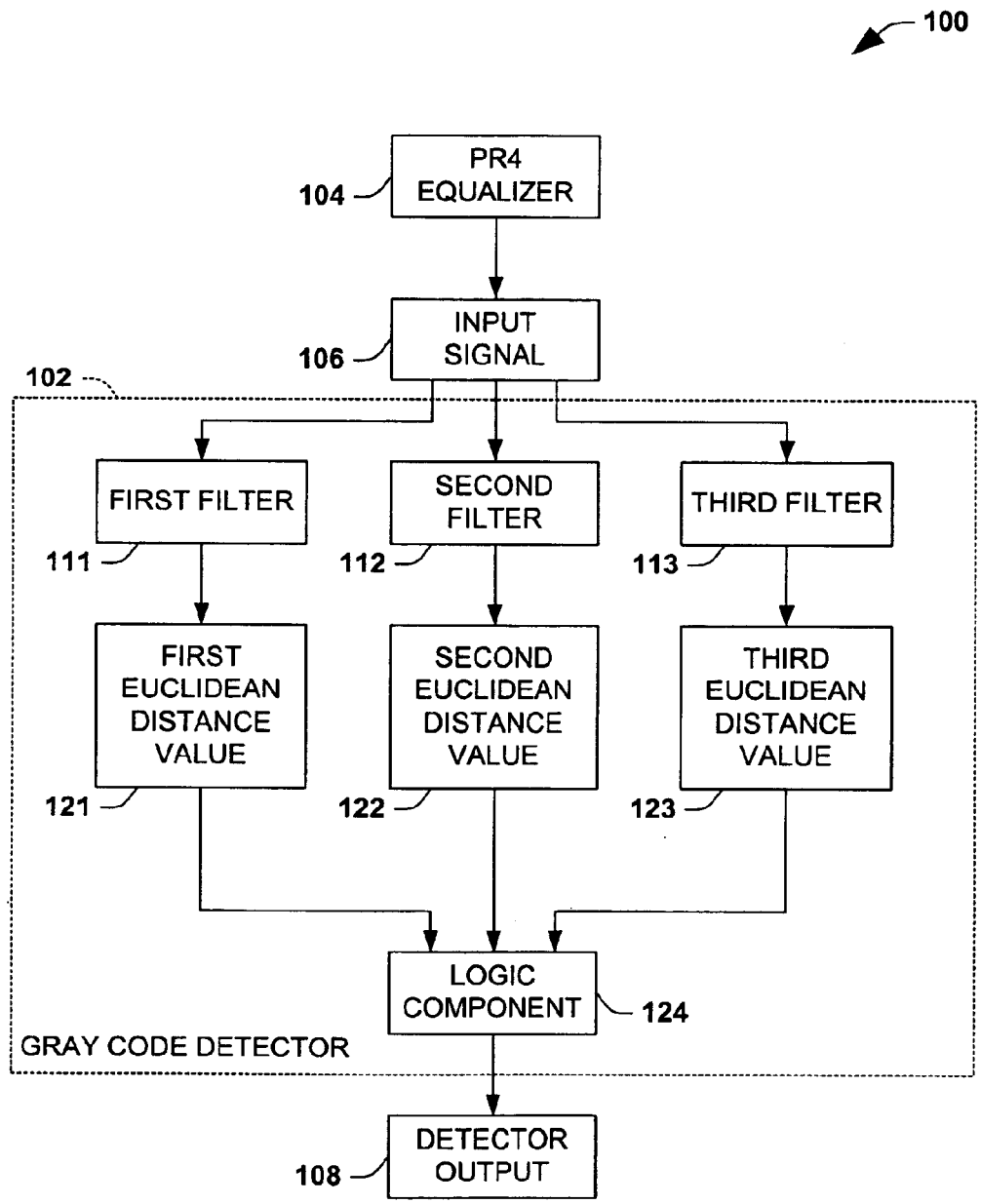
FIG. 3 is a simplified schematic diagram illustrating an exemplary phase tolerant Gray code detector in accordance with an aspect of the present invention.

Referring now to FIG. 3, a portion of an exemplary mass storage device read channel 100 is illustrated, having a Gray code detector 102 in accordance with the present invention. The read channel 100 comprises a PR4 equalizer component 104 providing a PR4 equalized Gray code input signal 106 to the detector 102, which in turn, provides a detector output 108. The detector 102 comprises first, second, and third filters 111, 112, and 113, which provide first, second, and third Euclidean distance values 121, 122, and 123, respectively, based on the input signal 106. Although three such filters 111, 112, and 113 are illustrated in the exemplary detector 102, any number of such filters may be provided in accordance with the invention, and may be implemented in hardware, software, and/or combinations thereof. In addition, the Gray code detector 102 comprises a logic component 124 providing the detector output 108 based on at least one of the first, second, and third Euclidean distance values 121, 122, and 123, respectively.

The outputs (e.g., Euclidean distance values) 121, 122, and/or 123 of the matched filters 111, 112, and 113 may be selectively employed by the logic component 124 to provide correct detector output data 108, even in the presence of phase shifting in the input signal 106, whereby ISI problems can be avoided or mitigated. For instance, the logic component 124 may selectively provide one of the Euclidean distance values 121, 122, or 123, or combinations thereof, as the detector output 108 according to whether the mass storage device is in seek mode or in track mode. In this manner, the invention provides for selection of the appropriate filter 111, 112, or 113 (e.g., or combinations thereof) to effectively combat ISI. The exemplary Gray code detector 102, moreover, may be employed as the detector 30 in the read channel 10 of FIG. 1.

As illustrated and described further hereinafter, the invention also provides for adjustable threshold comparisons with respect to the Euclidean distance values 121, 122, and 123 according to a selection criteria, such as detector mode (e.g., seek mode or track mode). In this regard, the threshold values compared with the filter outputs 121, 122, and/or 123 may be changed or adjusted by the logic component 124 depending on the detector mode, as well as the selection of which filter output to use as the detector output 108. Thus, one of the filter output Euclidean distance values 121, 122, or 123 may be used for the detector output 108 in a first mode, with combinations of filter outputs 121, 122, and/or 123 providing the detector output 108 in a second mode. In this manner, the invention provides for selective employment of matched filter outputs in order to improve phase tolerance and/or noise immunity in the read channel 100, depending upon how the device is being used (e.g., seek mode or track mode).

Figure 4:
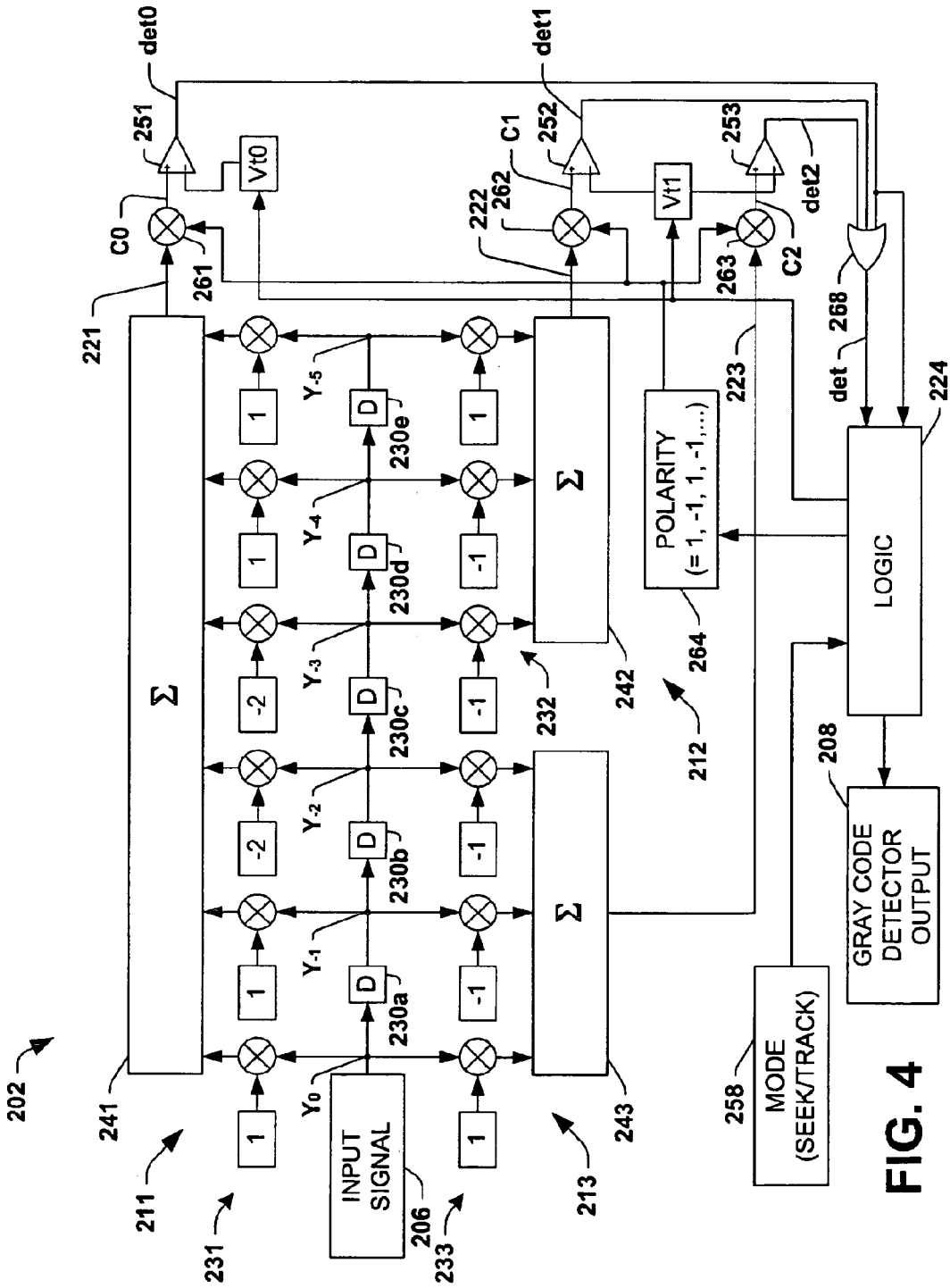
FIG. 4 is a detailed schematic diagram illustrating another exemplary Gray code detector in accordance with the present invention.

FIG. 4 illustrates another exemplary Gray code detector 202 for receiving a rate 1/6 PR4 equalized Gray code input signal 206 and providing a Gray code detector output 208, wherein the Gray code can be the code 240 of FIG. 7a. The detector comprises a first filter 211 providing a first Euclidean distance value 221, a second filter 212 providing a second Euclidean distance value 222, and a third filter 213 providing a third Euclidean distance value 223, wherein the Euclidean distance values 221, 222, and 223 are based on the input signal 206.

The PR4 equalized Gray code input signal 206 comprises six bits (e.g., or groups of six bits) $Y_{-5}$, $Y_{-4}$, $Y_{-3}$, $Y_{-2}$, $Y_{-1}$, and $Y_0$, which are provided to five serially connected delay blocks 230a through 230e for further operation thereon by the filters 211, 212, and/or 213. Referring also to FIG. 7a, the input signal 206 comprises gray code data represented by a rate 1/6 Gray code 240, wherein a gray code data "0" is represented in the Gray code 240 as an NRZI code of "001000" and a PR4 code of "001100" (e.g., or "00–1–100"), and wherein a gray code data "1" is represented in the Gray code 240 as an NRZI code of "101010" and a PR4 code of "11–1–111" (e.g., or alternatively "–1–111–1–1"). The polarity of the exemplary Gray code 240 of FIG. 7a alternates, wherein the detector 202 advantageously cancels the polarity alternation using a polarity value 264 as described hereinafter. Another exemplary Gray code 298 is illustrated in FIG. 7b in accordance with the invention.

Referring again to FIG. 4, the first filter 211 provides the first Euclidean distance value 221 as $(Y_{-5}+Y_{-4}-2Y_{-3}-2Y_{-2}+Y_{-1}+Y_0)$, via multiplication of the various input bits $Y_{-5}$, $Y_{-4}$, $Y_{-3}$, $Y_{-2}$, $Y_{-1}$, and $Y_0$ with corresponding filter coefficients 231 (e.g., 1, 1, −2, −2, 1, and 1, respectively), and associated multiplication components (not numerically designated), wherein the multiplied bit values are summed using a summer 241. The second matched filter 212 provides the second Euclidean distance value 222 as $(Y_{-5}-Y_{-4}-Y_{-3})$ via associated filter coefficients 232 (e.g., −1, −1, and 1) and a summer 242, and the third filter 213 provides the third Euclidean distance value 223 as $(-Y_{-2}-Y_{-1}+Y_0)$ via coefficients 233 (e.g., 1, −1, and −1) and a summer 243. The detector 202 further comprises a logic component 224 providing the Gray code detector output 208 based on at least one of the first, second, and third Euclidean distance values 221, 222, and 223, as described further hereinafter.

The Gray code detector 202 also comprises first, second, and third comparators 251, 252, and 253, which provide first, second, and third comparison values det0, det1, and det2, respectively, based on comparisons of the Euclidean distance values 221, 222, and 223 with threshold values Vt0 and Vt1. In the exemplary detector 202, the first comparator 251 compares the first Euclidean distance value 221 with Vt0, and the second and third comparators 252 and 253 compare the second and third Euclidean distance values 222 and 223, respectively, with the threshold value Vt1, in order to provide the comparison values det0, det1, and det2. The Gray code detector 202 further comprises first, second, and third multipliers 261, 262, and 263, which multiply the first, second, and third Euclidean distance values 221, 222, and 223, respectively, by a polarity value 264 to provide first, second, and third multiplied Euclidean distance values C0, C1, and C2 to the first, second, and third comparators 251, 252, and 253, respectively.

Referring also to FIG. 5, the polarity value 264 is a sequence of alternating "1" and "−1" values to provide for successive polarity switching of the multiplied Euclidean distance values C0, C1, and C2, in order to cancel the polarity alternation of the exemplary Gray code 240 (e.g., FIG. 7a). In this regard, the sequence of the polarity value 264 can be generated according to the synchronous servo mark (e.g., SSM field 64 of FIG. 2) in the servo sector, for example, wherein the polarity of the first Gray code depends upon the polarity of the last "1" in the SSM field. As illustrated in the table 248 of FIG. 5, with a threshold Vt0 of 2.0 in track mode, the Gray code is properly detected using the detector 202 of FIG. 4, with the logic component 224 providing the output 208 in accordance with the first Euclidean distance value 221 (e.g., $(Y_{-5}+Y_{-4}-2Y_{-3}-2Y_{-2}+Y_{-1}+Y_0)$ from the filter 211, multiplied by the polarity value 264.

The logic component 224 selectively provides the detector output 208 based on the first Euclidean distance value 221 when a detector mode 258 is a track mode, and the logic component 224 provides the detector output based on a logical OR of the first, second, and third Euclidean distance values 221, 222, and 223, via an OR gate 268 when the detector mode 258 is a seek mode. As illustrated in the table 278 of FIG. 6, the comparison values det0, det1, and det2 in the detector 202 provide varying results depending upon phase errors in the input signal 206. In the table 278, results are illustrated for various equalizer outputs (e.g., from the PR4 equalizer 20 of FIG. 1) depending upon the shifting of the input signal bits $Y_{-5}$, $Y_{-4}$, $Y_{-3}$, $Y_{-2}$, $Y_{-1}$, and $Y_0$ when the detector 202 is in seek mode (e.g., shifted to the left or right by one bit). Accordingly, the invention provides for selective employment of one or more of the comparison values det0, det1, and det2 in the detector 202, or combinations thereof, via the logic component 224, as further illustrated and described below with respect to FIG. 9.

Referring also to table 288 of FIG. 8, the logic component 224 is operative to detect the mode 258 (e.g., seek mode or track mode), and to selectively provide the threshold values Vt0 and Vt1 accordingly. For instance, in one implementation, the threshold value Vt0 is 2.0 when the detector mode 258 is a track mode, and 3.5 when the detector mode is a seek mode. In track mode operation, the logic component 224 employs the first comparison value det0 as the detector output 208. However, in accordance with another exemplary aspect of the invention, when the detector mode 258 is seek mode, the logic component 224 provides a threshold value Vt1 of 1.5 to the comparators 252 and 253, and provides the logical ORing of the comparison values det0, det1, and det2 (e.g., signal "det" in FIG. 4) as the output 208. In this fashion, the output 208 is logic "1" if any of the comparison values det0, det1, or det2 is "1", and "0" otherwise.

Thus, as illustrated in table 278 of FIG. 6, in the seek mode, although the first comparison value det0 has an indeterminate value (e.g., indicated by an "x" in the table) under certain phase error conditions when the code is "1", and although the second and third comparison values det1 and det2 are indeterminate for no phase error when the code is "1", the logical ORing of these comparison values det0, det1, and det2 (e.g., output signal det from gate 268 in FIG. 4) provides the proper value for the detector output 208. Thus, the detector 202 provides phase tolerant Gray code detection via the selective application of at least one of a plurality of filters (e.g., filters 211, 212, and/or 213) or combinations thereof in generating the output 208. Referring briefly to FIG. 10, a table 299 illustrates the Euclidean distance values $d^2$ for the exemplary detector 202 in the presence of phase errors, wherein adequate Euclidean distances are provided in the event of such phase errors in accordance with the invention. The logic component 224 of the detector 202 may optionally provide for programmable values of the threshold Vt1, for example, such as one of 1.5, 1.75, 2.0, and 2.25 when the detector mode is a seek mode, as illustrated in table 288 of FIG. 8.

Thus in track mode, the logic component 224 provides a detector output 208 of "1" when the first Euclidean distance value 221 (e.g., multiplied by the polarity value 264) exceeds the threshold value Vt0 (e.g., 3.50), and provides an output 208 of "0" when the first Euclidean distance value 221 does not exceed Vt0. When the mode 258 is seek mode, the logic component 224 provides a detector output 208 of "1" when the first Euclidean distance value 221 exceeds the threshold value Vt1 (e.g., 2.0), or the second Euclidean distance value 222 (e.g., multiplied by the polarity value 264) exceeds Vt1 (e.g., programmable to one of 1.5, 1.75, 2.0, and 2.25, such as 1.5) or the third Euclidean distance value 223 exceeds Vt1, and otherwise provides a detector output 208 of "0".

Figure 9:
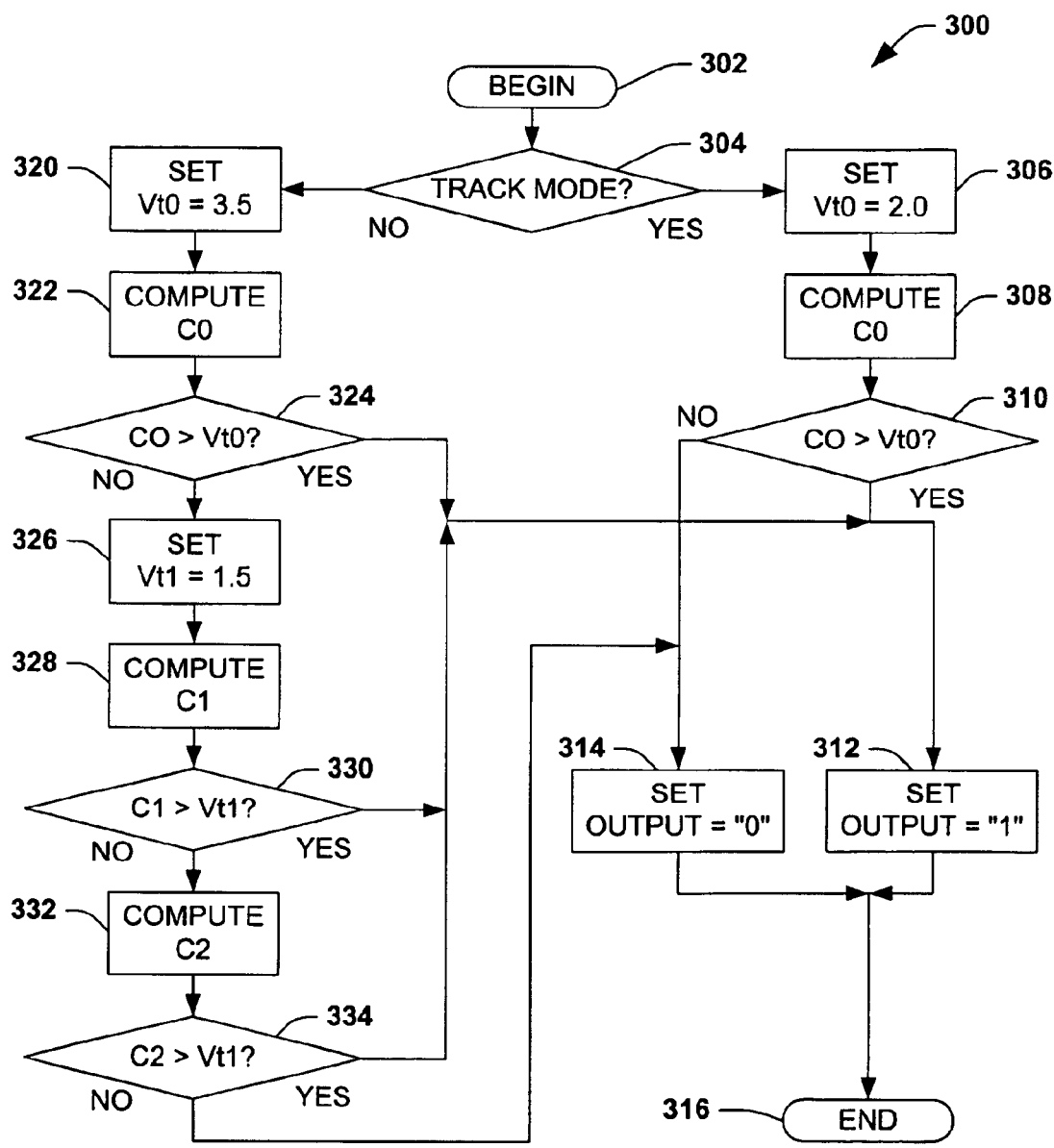
FIG. 9 is a flow diagram further illustrating the logic component of the Gray code detector of FIG. 4.

Referring now to FIG. 9, further details of the operation of the logic component 224 are illustrated in a flow diagram of an exemplary methodology 300 for detecting a PR4 equalized rate 1/6 Gray code in accordance with the present invention. While the exemplary method 300 is illustrated and described herein as a series of acts or events, it will be appreciated that the present invention is not limited by the illustrated ordering of such acts or events, as some acts may occur in different orders and/or concurrently with respect to other acts or events apart from those illustrated and/or described herein, in accordance with the invention. In addition, not all illustrated steps may be required to implement a methodology in accordance with the present invention. Moreover, it will be appreciated that the method 300 may be implemented in association with the detector apparatus and systems illustrated and described herein as well as in association with other systems not illustrated.

Beginning at 302, a determination is made at 304 as to whether the detector is in track mode. If so (e.g., YES at 304), Vt0 is set to 2.0 at 306, and the first comparison value C0 is computed (e.g., as $(Y_{-5}+Y_{-4}-2Y_{-3}-2Y_{-2}+Y_{-1}+Y_0)$ in the exemplary detector 202) at 308. At 310, a determination is made as to whether the first comparison value C0 is greater than Vt0, and if so (e.g., YES at 310), the output is set to "1" at 312. Otherwise (e.g., NO at 310), the output is set to "0" at 314. Thereafter, the method 300 returns to process further bits at 302 or ends at 316. The comparison value C0 (e.g., as well as values C1 and C2 below) may alternatively multiplied by a polarity value (e.g., value 258 of detector 202) in accordance with the invention.

If, however, the detector is not in track mode at 304 (e.g., the detector is in seek mode), Vt0 is set to 3.5 at 320 and C0 is computed (e.g., as $(Y_{-5}+Y_{-4}-2Y_{-3}-2Y_{-2}+Y_{-1}+Y_0)$) at 322. A determination is made at 324 as to whether C0 is greater than Vt0, and if so (e.g., YES at 324), the output is set to "1" at 312. Otherwise (e.g., NO at 324), Vt1 is set to 1.5 at 326 and C1 is computed (e.g., as $(Y_{-5}-Y_{-4}-Y_{-3})$) at 328. Optionally, the threshold value Vt1 can be set to a programmable value (e.g., one of 1.5, 1.75, 2.0, and 2.25, such as 1.5) at 326. A determination is then made at 330 as to whether C1 exceeds Vt1, and if so, the output is set to "1" at 312. Otherwise (e.g., NO at 330), C2 is computed at 332 (e.g., as $(-Y_{-2}-Y_{-1}+Y_0)$) and a determination is made at 334 as to whether C2 exceeds Vt1. If so (e.g., YES at 334), the output is set to "1" at 312, and if not (e.g., NO at 334), the output is set to "0" at 314.

Figure 11:
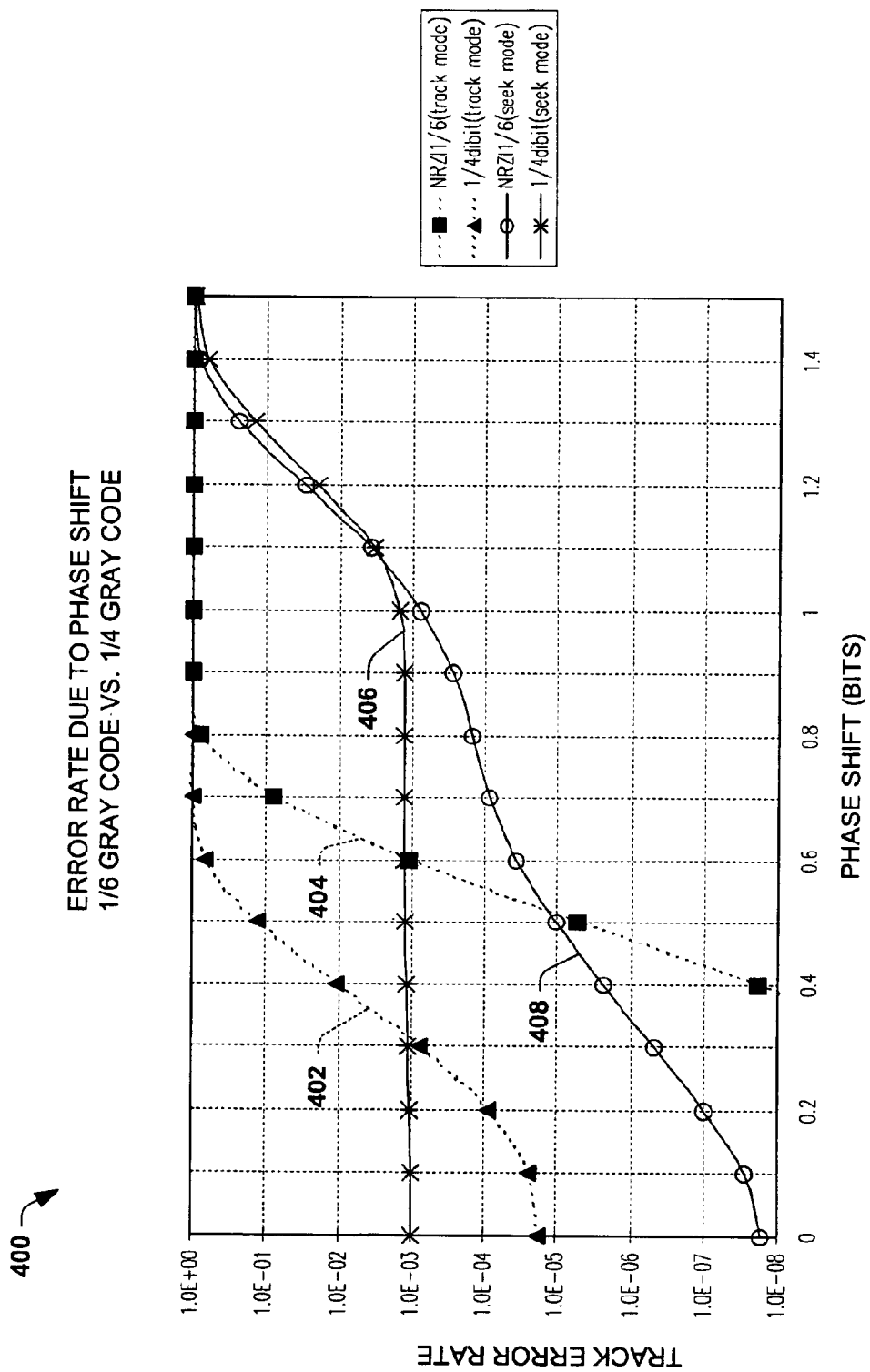
FIG. 11 is a graph of track error rate versus phase shift for an exemplary rate 1/6 Gray code in accordance with the present invention.

Referring now to FIGS. 11–14, the apparatus and methodologies of the present invention achieve improved phase tolerance in Gray code detection in both the seek and track modes. The graphs of FIGS. 11–14 illustrate various performance advantages attainable via the exemplary Gray code of FIG. 7a employed in association with the exemplary Gray code detector apparatus of FIGS. 3 and/or 4. Similar results may likewise be obtained in accordance with the methodologies of the present invention, for example, such as the exemplary method 300 of FIG. 9. FIG. 11 illustrates a graph 400 of track error rate as a function of phase shift for 1/4 and 1/6 Gray codes in seek and track modes, wherein the 1/6 Gray code results are obtained according to the illustrated detectors and codes of the invention. In track mode, a rate 1/4 Gray code curve 402 shows significantly higher error rate compared with a rate 1/6 curve 404 in accordance with the invention. Likewise in seek mode, a rate 1/4 Gray code curve 406 suffers higher error rate than a rate 1/6 curve 408 in accordance with the invention.

Figure 12:
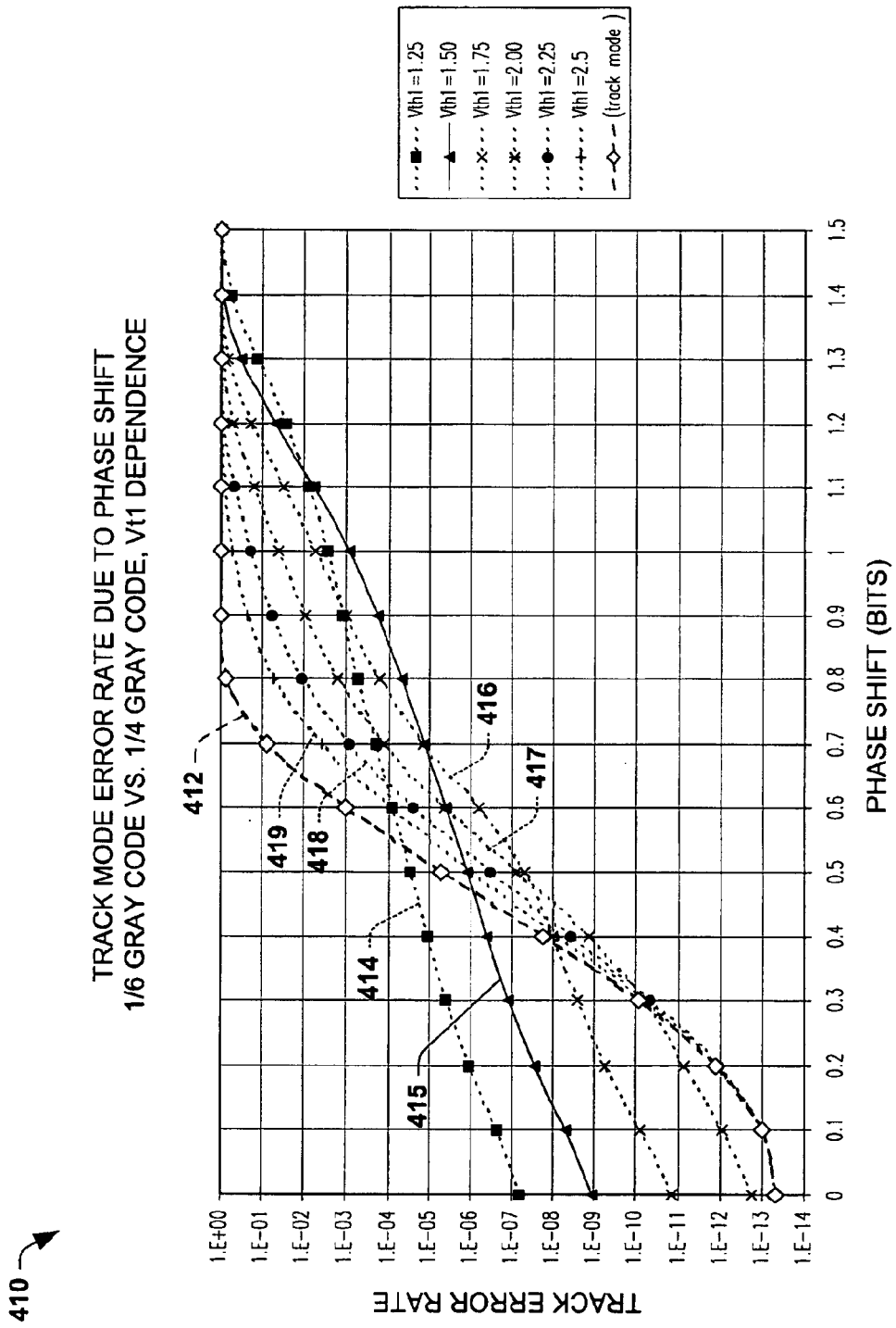
FIG. 12 is another graph of track error rate versus phase shift for an exemplary rate 1/6 Gray code for various Vt1 threshold values in accordance with the present invention.
Figure 13:
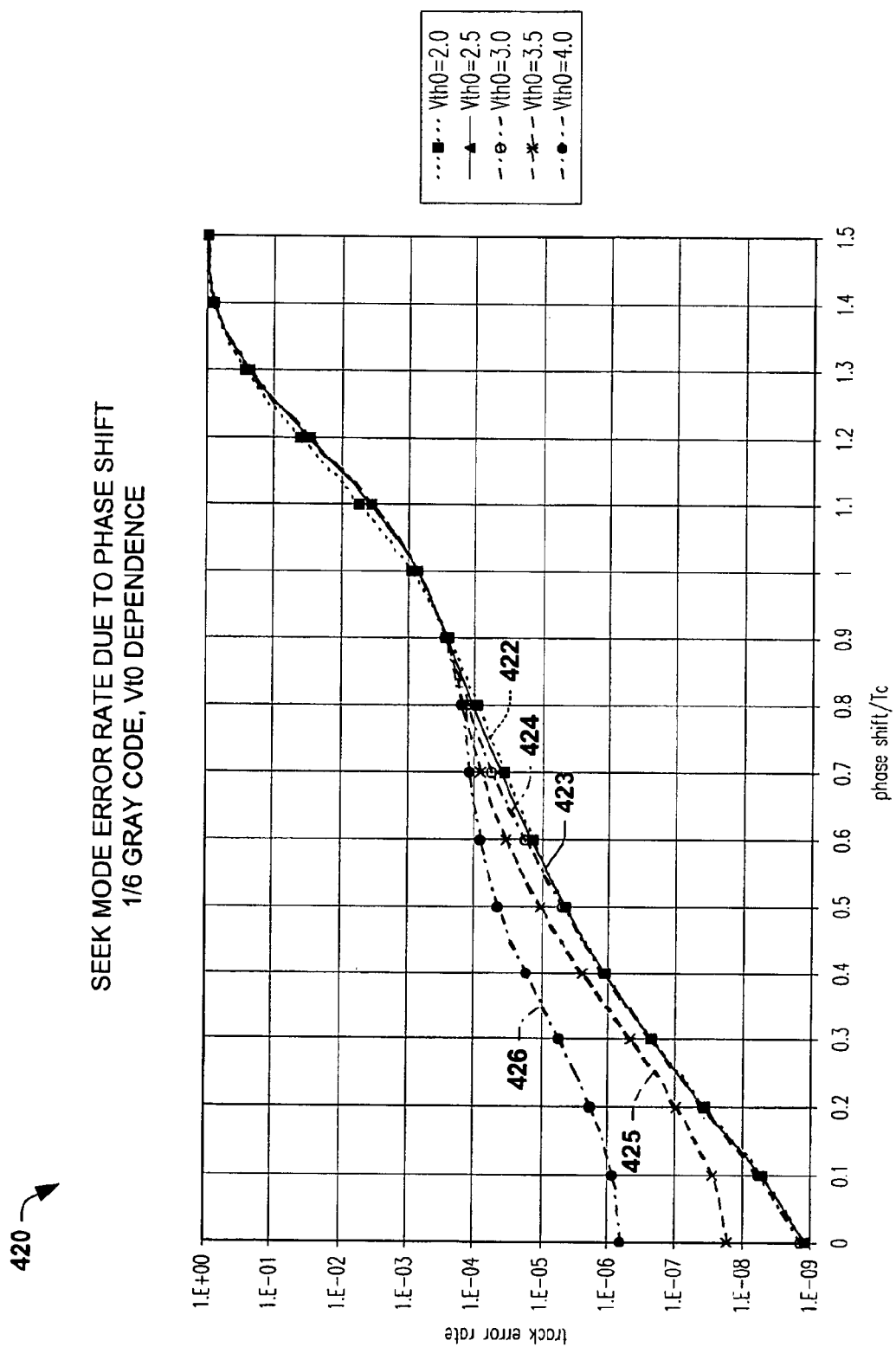
FIG. 13 is another graph of track error rate versus phase shift for an exemplary rate 1/6 Gray code for various Vt0 threshold values in accordance with the present invention.

FIG. 12 illustrates a graph 410 of error rate versus phase shift in track mode, wherein the effects of varying the exemplary threshold value Vt1 (e.g., FIG. 4) are shown, wherein a rate 1/4 Gray code curve 412 is compared with rate 1/6 Gray code implementations 414, 415, 416, 417, 418, and 419 using threshold Vt1 values of 1.25, 1.50, 1.75, 2.00, 2.25, and 2.50, respectively, with threshold value Vt0 at 2.00. As can be seen from the graph 410, programmability of the threshold value Vt1 can be employed to advantageously improve phase tolerance in Gray code detection in accordance with an aspect of the invention. FIG. 13 provides a graph 420 of error rate versus phase shift in seek mode, wherein the effects of varying the exemplary threshold value Vt0 are illustrated for the above illustrated rate 1/6 gray code of FIG. 7a. Curves 422, 423, 424, 425, and 426 are illustrated in the graph 420 for Vt0 values of 2.0, 2.5, 3.0, 3.5, and 4.0, respectively. In FIG. 14, a graph 430 compares the performance of the exemplary Gray code and detector of FIGS. 7a and 4, respectively, with a rate 1/4 Gray code with respect to required signal to noise ratio (SNR) versus channel density. Rate 1/6 curves 432 and 434 for track and seek modes, respectively, both outperform corresponding rate 1/4 curves 436 and 438, requiring significantly less SNR. The exemplary results illustrated in FIGS. 11–14, and similar results, may be obtained through implementation of the various aspects of the present invention, by which phase tolerant Gray code detection can be achieved.

Although the invention has been shown and described with respect to one or more implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description and the claims, such terms are intended to be inclusive in a manner similar to the term "comprising."

What is claimed is:

1. A Gray code detector for receiving a PR4 equalized Gray code input signal and providing a detector output, the detector comprising:

first, second, and third filters providing first, second, and third Euclidean distance values, respectively, based on the input signal;

a logic component providing the detector output based on at least one of the first, second, and third Euclidean distance values; and first, second, and third comparators providing first, second, and third comparison values, based on comparisons of the first, second, and third Euclidean distance values with first, second, and third threshold values, respectively, wherein the logic component provides the detector output based on at least one of the first, second, and third comparison values.

2. The Gray code detector of claim 1, comprising first, second, and third multipliers operative to multiply the first, second, and third Euclidean distance values by a polarity value and to provide first, second, and third multiplied Euclidean distance values to the first, second, and third comparators, respectively.

3. The Gray code detector of claim 2, wherein the logic component provides the detector output based on the first Euclidean distance value when the detector mode is a track mode, and wherein the logic component provides the detector output based on a logical OR of the first, second, and third comparison values when the detector mode is a seek mode.

4. The Gray code detector of claim 3, wherein the logic component provides a detector output of "1" when the first Euclidean distance value exceeds the first threshold value and the detector mode is a track mode, and provides a detector output of "0" when the first Euclidean distance value does not exceed the first threshold value and the detector mode is the track mode.

5. The Gray code detector of claim 4, wherein the logic component provides a detector output of "1" when the first Euclidean distance value exceeds the first threshold value or the second Euclidean distance value exceeds the second threshold value or the third Euclidean distance value exceeds the third threshold value and the detector mode is a seek mode, and otherwise provides a detector output of "0" when the detector mode is the seek mode.

6. The Gray code detector of claim 5, comprising first, second, third, fourth, and fifth serially connected delay components providing first, second, third, fourth, and fifth delayed bits from the input signal;

wherein the first filter comprises a first summer, a plurality of first filter multipliers, and a corresponding plurality of first filter coefficients, wherein the first filter multipliers are individually operative to multiply the corresponding first filter coefficient with one of the first, second, third, fourth, and fifth delayed bits and a 0th bit from the input signal, and wherein the first summer provides the first Euclidean distance value as the sum of outputs from the plurality of first filter multipliers;

wherein the second filter comprises a second summer, a plurality of second filter multipliers, and a corresponding plurality of a second filter coefficients, wherein the second filter multipliers are individually operative to multiply the corresponding second filter coefficient with one of the third, fourth, and fifth delayed bits from the input signal, and wherein the second summer provides the second Euclidean distance value as the sum of outputs from the plurality of second filter multipliers; and wherein the third filter comprises a third summer, a plurality of third filter multipliers, and a corresponding plurality of a third filter coefficients, wherein the third filter multipliers are individually operative to multiply the corresponding third filter coefficient with one of the first and second delayed bits and the 0th bit from the input signal, and wherein the third summer provides the third Euclidean distance value as the sum of outputs from the plurality of third filter multipliers.

7. The Gray code detector of claim 5, wherein the Gray code input signal comprises six bits $Y_{-5}, Y_{-4}, Y_{-3}, Y_{-2}, Y_{-1}$, and $Y_0$;

wherein the first filter provides the first Euclidean distance value as $(Y_{-5}+Y_{-4}-2Y_{-3}-2Y_{-2}+Y_{-1}+Y_0)$;

wherein the second filter provides the second Euclidean distance value as $(Y_{-5}-Y_{-4}-Y_{-3})$; and wherein the third filter provides the third Euclidean distance value as $(-Y_{-2}-Y_{-1}+Y_0)$.

8. The Gray code detector of claim 7, wherein the Gray code input signal comprises gray code data represented by a rate 1/6 Gray code, wherein a gray code data "0" is represented in the Gray code as an NRZI code of "001000" and a PR4 code of "001100", and wherein a gray code data "1" is represented in the Gray code as an NRZI code of "101010" and a PR4 code of "11−1−111".

9. The Gray code detector of claim 8, wherein the logic component provides the first, second, and third threshold values according to a detector mode.

10. The Gray code detector of claim 9, wherein the first threshold value is 2.0 when the detector mode is a track mode, and wherein first threshold value is 3.5 and the second and third threshold values are one of 1.5, 1.75, 2.0, and 2.25 when the detector mode is a seek mode.

11. The Gray code detector of claim 2, wherein the logic component provides the polarity value to the first, second, and third multipliers according to SSM data in the input signal.

12. The Gray code detector of claim 1, wherein the first threshold value is 2.0 when the detector is in a track mode, and wherein first threshold value is 3.5 and the second and third threshold values are one of 1.5, 1.75, 2.0, and 2.25 when the detector is in a seek mode.

13. The Gray code detector of claim 12, wherein the logic component provides a detector output of "1" when the first Euclidean distance value exceeds the first threshold value and the detector is in a track mode, and provides a detector output of "0" when the first Euclidean distance value does not exceed the first threshold value and the detector is in the track mode.

14. The Gray code detector of claim 13, wherein the logic component provides a detector output of "1" when the first Euclidean distance value exceeds the first threshold value or the second Euclidean distance value exceeds the second threshold value or the third Euclidean distance value exceeds the third threshold value and the detector is in a seek mode, and otherwise provides a detector output of "0" when the detector is in the seek mode.

15. A Gray code detector for receiving a PR4 equalized Gray code input signal and providing a detector output, the detector comprising:

first, second, and third filters providing first, second, and third Euclidean distance values, respectively, based on the input signal; and a logic component providing the detector output based on at least one of the first, second, and third Euclidean distance values;

wherein the Gray code input signal comprises six bits $Y_{-5}, Y_{-4}, Y_{-3}, Y_{-2}, Y_{-1}$, and $Y_0$;

wherein the first filter provides the first Euclidean distance value as $(Y_{-5}+Y_{-4}-2Y_{-3}-2Y_{-2}+Y_{-1}+Y_0)$;

wherein the second filter provides the second Euclidean distance value as $(Y_{-5}-Y_{-4}-Y_{-3})$; and wherein the third filter provides the third Euclidean distance value as $(-Y_{-2}-Y_{-1}+Y_0)$.

16. The Gray code detector of claim 15, wherein the Gray code input signal comprises gray code data represented by a rate 1/6 Gray code, wherein a gray code data "0" is represented in the Gray code as an NRZI code of "001000" and a PR4 code of "001100", and wherein a gray code data "1" is represented in the Gray code as an NRZI code of "101010" and a PR4 code of "11−1−111".

17. A Gray code detector for receiving a PR4 equalized Gray code input signal and providing a detector output, the detector comprising:

first, second, and third filters providing first, second, and third Euclidean distance values, respectively, based on the input signal; and a logic component providing the detector output based on at least one of the first, second, and third Euclidean distance values;

wherein the Gray code input signal comprises gray code data represented by a rate 1/6 Gray code, wherein a gray code data "0" is represented in the Gray code as an NRZI code of "001000" and a PR4 code of "001100" or "00−1−100", and wherein a gray code data "1" is represented in the Gray code as an NRZI code of "101010" and a PR4 code of "11−1−111" or "−1−111−1−1".

18. A method of detecting a PR4 equalized rate 1/6 Gray code in an input signal, wherein a pray code data "0" is represented in the Gray code as an NRZI code of "001000" and a PR4 code of "001100", and wherein a gray code data "1" is represented in the Gray code as an NRZI code of "10101" and a PR4 code of "11−1−111", the method comprising:

providing first, second, and third Euclidean distance values based on the input signal; and providing a detector output based on at least one of the first, second, and third Euclidean distance values, wherein the Gray code input signal comprises six bits $Y_{-5}, Y_{-4}, Y_{-3}, Y_{-2}, Y_{-1}$, and $Y_0$;

wherein providing the first Euclidean distance comprises computing $(Y_{-5}+Y_{-4}-2Y_{-3}-2Y_{-2}+Y_{-1}+Y_0)$;

wherein providing the second Euclidean distance comprises computing $(Y_{-5}-Y_{-4}-Y_{-3})$; and wherein providing the third Euclidean distance comprises computing $(-Y_{-2}-Y_{-1}+Y_0)$.

19. The method of claim 18, wherein providing first, second, and third Euclidean distance values comprises multiplying the first, second, and third Euclidean distance values by a polarity value.

20. A method of detecting a PR4 equalized rate 1/6 Gray code in an input signal, wherein a gray code data "0" is represented in the Gray code as an NRZI code of "001000" and a PR4 code of "001100", and wherein a gray code data "1" is represented in the Gray code as an NRZI code of "101010" and a PR4 code of "11−1−111", the method comprising:

providing first, second, and third Euclidean distance values based on the input signal; and providing a detector output based on at least one of the first, second, and third Euclidean distance values,
wherein providing the detector output comprises:
comparing the first, second, and third Euclidean distance values with first, second, and third threshold values to provide first, second, and third comparison values, respectively;
providing the detector output based on the first Euclidean distance value when the detector is in a track mode; and
providing the detector output based on a logical OR of the first, second, and third comparison values when the detector mode is a seek mode.

21. The method of claim 20, wherein providing the detector output comprises:
providing a detector output of "1" when the first Euclidean distance value exceeds the first threshold value and the detector is in the track mode;
providing a detector output of "0" when the first Euclidean distance value does not exceed the first threshold value and the detector is in the track mode;
providing a detector output of "1" when the first Euclidean distance value exceeds the first threshold value or the second Euclidean distance value exceeds the second threshold value or the third Euclidean distance value exceeds the third threshold value and the detector is in a seek mode; and
otherwise providing a detector output of "0" when the detector is in the seek mode.

22. A mass storage device read channel, comprising:
a circuit operative to receive data signals representing a Gray code from a storage medium;
an equalizer circuit operative to modify the data signals to a PR4 target to produce a Gray code input signal; and
a Gray code detector, comprising:
first, second, and third filters providing first, second, and third Euclidean distance values, respective, based on the Gray code input signal;
a logic component providing the detector output based on at least one of the first, second, and third Euclidean distance values; and
first, second, and third comparators providing first, second, and third comparison values, based on comparisons of the first, second, and third Euclidean distance values with first, second, and third threshold values, respectively, wherein the logic component provides the detector output based on at least one of the first, second, and third comparison values.

23. The read channel of claim 22, the Gray code detector comprising first, second, and third multipliers operative to multiply the first, second, and third Euclidean distance values by a polarity value and to provide first, second, and third multiplied Euclidean distance values to the first, second, and third comparators, respectively.

24. The read channel of claim 23, wherein the logic component provides the detector output based on the first Euclidean distance value when the detector mode is a track mode, and wherein the logic component provides the detector output based on a logical OR of the first, second, and third comparison values when the detector mode is a seek mode.

25. The read channel of claim 24, wherein the logic component provides a detector output of "1" when the first Euclidean distance value exceeds the first threshold value and the detector mode is a track mode, and provides a detector output of "0" when the first Euclidean distance value does not exceed the first threshold value and the detector mode is the track mode.

26. The read channel of claim 25, wherein the logic component provides a detector output of "1" when the first Euclidean distance value exceeds the first threshold value or the second Euclidean distance value exceeds the second threshold value or the third Euclidean distance value exceeds the third threshold value and the detector mode is a seek mode, and otherwise provides a detector output of "0" when the detector mode is the seek mode.

27. The read channel of claim 26, the Gray code detector comprising first, second, third, fourth, and fifth serially connected delay components providing first, second, third, fourth, and fifth delayed bits from the input signal;
wherein the first filter comprises a first summer, a plurality of first filter multipliers, and a corresponding plurality of first filter coefficients, wherein the first filter multipliers are individually operative to multiply the corresponding first filter coefficient with one of the first, second, third, fourth, and fifth delayed bits and a 0th bit from the input signal, and wherein the first summer provides the first Euclidean distance value as the sum of outputs from the plurality of first filter multipliers;
wherein the second filter comprises a second summer, a plurality of second filter multipliers, and a corresponding plurality of a second filter coefficients, wherein the second filter multipliers are individually operative to multiply the corresponding second filter coefficient with one of the third, fourth, and fifth delayed bits from the input signal, and wherein the second summer provides the second Euclidean distance value as the sum of outputs from the plurality of second filter multipliers; and
wherein the third filter comprises a third summer, a plurality of third filter multipliers, and a corresponding plurality of a third filter coefficients, wherein the third filter multipliers are individually operative to multiply the corresponding third filter coefficient with one of the first and second delayed bits and the 0th bit from the input signal, and wherein the third summer provides the third Euclidean distance value as the sum of outputs from the plurality of third filter multipliers.

28. The read channel of claim 26, wherein the Gray code input signal comprises six bits $Y_{-5}, Y_{-4}, Y_{-3}, Y_{-2}, Y_{-1}$, and $Y_0$;
wherein the first filter provides the first Euclidean distance value as $(Y_{-5}+Y_{-4}-2Y_{-3}-2Y_{-2}+Y_{-1}+Y_0)$;
wherein the second filter provides the second Euclidean distance value as $(Y_{-5}-Y_{-4}-Y_{-3})$; and
wherein the third filter provides the third Euclidean distance value as $(-Y_{-2}-Y_{-1}+Y_0)$.

29. The read channel of claim 28, wherein the Gray code input signal comprises gray code data represented by a rate 1/6 Gray code, wherein a gray code data "0" is represented in the Gray code as an NRZI code of "001000" and a PR4 code of "001100", and wherein a gray code data "1" is represented in the Gray code as an NRZI code of "101010" and a PR4 code of "11−1−111".

30. The read channel of claim 29, wherein the logic component provides the first, second, and third threshold values according to a detector mode.

31. The read channel of claim 30, wherein the first threshold value is 2.0 when the detector mode is a track mode, and wherein first threshold value is 3.5 and the second and third threshold values are one of 1.5, 1.75, 2.0, and 2.25 when the detector mode is a seek mode.

* * * * *